(12) United States Patent
Hase

(10) Patent No.: US 7,658,003 B2
(45) Date of Patent: Feb. 9, 2010

(54) METHOD AND APPARATUS FOR REMOVING FRACTURE POWDER FROM FRACTURE SURFACES OF A DUCTILE METAL PART

(75) Inventor: Hiroichi Hase, Mie (JP)

(73) Assignee: The Yasunaga Co., Ltd., Iga, Mie (JP)

( * ) Notice: Subject to any disclaimer, the term of this patent is extended or adjusted under 35 U.S.C. 154(b) by 653 days.

(21) Appl. No.: 11/011,070

(22) Filed: Dec. 15, 2004

(65) Prior Publication Data

US 2005/0172484 A1     Aug. 11, 2005

(30) Foreign Application Priority Data

Feb. 6, 2004    (JP)    ............................. 2004-030030

(51) Int. Cl.
*B21D 53/84*    (2006.01)

(52) U.S. Cl. ................ 29/888.09; 29/416; 29/DIG. 46; 29/821

(58) Field of Classification Search ............. 29/402.01, 29/888.09, 888.091, 416, DIG. 46, 821

See application file for complete search history.

(56) References Cited

U.S. PATENT DOCUMENTS

| | | | |
|---|---|---|---|
| 6,671,955 B2 * | 1/2004 | Hugler | ..................... 29/888.09 |
| 7,143,915 B2 * | 12/2006 | Guirgis | ........................ 225/2 |

FOREIGN PATENT DOCUMENTS

| | | |
|---|---|---|
| JP | 2000-74067 A | 3/2000 |
| JP | 2002-66998 | 3/2002 |
| JP | 2003-512522 A | 4/2003 |

\* cited by examiner

*Primary Examiner*—Rick K Chang
(74) *Attorney, Agent, or Firm*—Morgan Lewis & Bockius LLP

(57) ABSTRACT

A fracture surface treatment method of a fractured ductile metal part for treating fracture surfaces 51a and 52a of the ductile metal part 50, said fracture surfaces 51a and 52a being fracture surfaces obtained by a fracturing operation of fitting halved mandrel portions into a penetrative bore of the ductile metal part having the penetrative bore and driving a wedge in between the halved mandrel portions, said fracture surface treatment method holding said fractured ductile metal part 50 in a state where said fracture surfaces 51a and 52a are separated from each other so as to keep a certain space between them, applying a specified vibration to at least one of said fractured ductile metal part portions in a direction intersecting the direction of fracture and removing fracture powder 59 stuck on said fracture surfaces 51a and 52a, and thereby enabling the optimum face fitting operation in case of fitting again the fracture surfaces of the fractured ductile metal part to each other.

5 Claims, 3 Drawing Sheets

METHOD AND APPARATUS FOR REMOVING FRACTURE POWDER FROM FRACTURE SURFACES OF A DUCTILE METAL PART

This nonprovisional application claims priority under 35 U.S.C. § 119(a) on Patent Application No. 2004-030030 filed in Japan on Feb. 6, 2004, the entire contents of which are hereby incorporated by reference.

BACKGROUND OF THE INVENTION

1. Field of the Invention

The present invention relates to a fracture surface treatment method and a fracture surface treatment apparatus for treating fracture surfaces made by tension-fracturing a ductile metal part such as a connecting rod or the like for example, and a manufacturing method and a manufacturing apparatus of a ductile metal part being fractured and having its fracture surfaces treated.

2. Description of the Related Art

There is a case of tension-fracturing a ductile metal part, and recombining together the halved part portions into a single product to be used. As an example of such parts, a connecting rod known as one of car parts is mentioned. And as a method for separating a larger end portion of a connecting rod into two parts, namely, rod and cap portions, there is a so-called fracture splitting (FS) method. An example of such an FS method applies a pre-load to a mandrel by pressing a wedge against the mandrel and then applies a dynamic load to it and thereby fractures a connecting rod (see Japanese Patent Laid-Open Publication No. 2002-66,998 for example).

Further, there is also known a fracture surface treatment method for treating fracture surfaces of such a fractured connecting rod. Concretely, for example, there is known a fracture surface treatment method for removing material particles (fracture powder) from fracture surfaces in case of separating members such as a connecting rod, a bearing, an annular enclosure and the like by fracture (see Japanese Patent Laid-Open Publication No. 2003-512,522 for example).

In addition to this, there is also known a fracture surface treatment method for making it easy to separate the recombined connecting rod obtained by recombining and machining a fractured connecting rod into a connecting rod main body portion and a bearing cap portion, and thereby improving the assembly-operability in assembling them into an engine (see Japanese Patent Laid-Open Publication No. 2000-74,067 for example).

A fracture surface treatment method of a fractured connecting rod described in Japanese Patent Laid-Open Publication No. 2003-512,522 is a treatment method for removing particles having no or little adhesiveness (hereinafter, referred to as fracture powder) from fracture surfaces, and operates a controller and thereby makes a cylinder reciprocate.

Concretely, this method reciprocates the cap of a connecting rod by reciprocating the piston of a cylinder. And the method removes fracture powder from fracture surfaces by adjusting the range of this reciprocation so that the cap comes slightly into contact with the fracture surface of the connecting rod during the reciprocation of the cap.

However, since in such a fracture surface treatment method of a connecting rod the direction of vibration of the cap coincides with the direction of fracture of the connecting rod and such vibration that the cap comes slightly into contact with the fracture surface of the connecting rod is applied, a part of fracture powder is stripped off but the remaining part is firmly stuck onto the fracture surface by such a touching operation, and it is thought to have a bad influence on the face fitting operation of fracturing surfaces after that.

On the other hand, a fracture surface treatment method of a connecting rod described in Japanese Patent Laid-Open Publication No. 2003-512,522 is a method for making it easy to separate the recombined connecting rod obtained by recombining and machining a fractured connecting rod into a connecting rode main body portion and a bearing cap portion. Concretely, this method repeats three or more times an operation of applying and releasing a load to and from the connecting rod main body portion having the separated bearing cap portion attached to it before machining the recombined connecting rod obtained by recombining together the connecting rod main body portion and the bearing cap portion after fracture-separating the bearing cap portion from the connecting rod main body. However, performing only such an operation of pressing the fracture surfaces against each other makes part of fracture powder adhere firmly to the fracture surface of the connecting rod and it is thought to have a bad influence on the face fitting operation of the fracture surfaces after that.

SUMMARY OF THE INVENTION

An object of the present invention is to provide a fracture surface treatment method and a fracture surface treatment apparatus of a ductile metal part, and a manufacturing method and a manufacturing apparatus of a ductile metal part being fractured and having its fractured surfaces treated, for treating fracture surfaces so as to be capable of performing the optimum face fitting operation in case of fitting again the fracture surfaces of the fractured ductile metal part.

In order to solve the above-mentioned problem, according to the present invention, there is provided a fracture surface treatment method of a fractured ductile metal part for treating fracture surfaces of the fractured ductile metal part, wherein;

said fracture surfaces are fracture surfaces obtained by a fracturing operation of fitting halved mandrel portions into a penetrative bore of the ductile metal part having the penetrative bore and driving a wedge in between the halved mandrel portions, and fracture powder stuck on said fracture surfaces is removed by holding said fractured ductile metal part so that said fracture surfaces keep a certain space between them and by applying a specified vibration to at least one of said fractured ductile metal part portions in a direction intersecting the direction of fracture.

And according to the present invention, there is provided a fracture surface treatment apparatus of a fractured ductile metal part for treating fracture surfaces of the fractured ductile metal part, wherein;

said fracture surfaces are fracture surfaces obtained by a fracturing operation of fitting halved mandrel portions into a penetrative bore of the ductile metal part having the penetrative bore and driving a wedge in between the halved mandrel portions, and fracture powder stuck on said fracture surfaces is removed by providing a holding means for holding said fractured ductile metal part so that said fracture surfaces keep a certain space between them and a vibration applying means for applying a specified vibration to at least one of said fractured ductile metal part portions in a direction intersecting the direction of fracture.

By applying a specified vibration to fractured ductile metal part portions in a direction intersecting the direction of fracture in a state of holding the fractured ductile metal part so that the fracture surfaces keep a certain space between them, it is possible to apply vibration to fracture powder stuck on the fracture surfaces in a direction where the fracture powder is easily stripped off without bringing the fracture surfaces again into contact with each other. Due to this, the fracture powder is more securely stripped off from the fracture surfaces in comparison with a case of touching and separating the fracture surfaces to and from each other.

Preferably, a fracture surface treatment method of a fractured ductile metal part according to the present invention comprises of the step of blowing air to the fracture surfaces of the fractured ductile metal part at the time of applying said specified vibration to the said fractured ductile metal part.

Preferably, a fracture surface treatment apparatus of a fractured ductile metal part according to the present invention further comprises an air blowing means for blowing air to the fracture surfaces of the fractured ductile metal part at the time of applying said specified vibration to the said fractured ductile metal part.

The fracture powder stuck on the fracture surfaces is made easier to be stripped off by blowing air to the fracture surfaces by means of such an air blowing means.

Preferably, a fracture surface treatment method of a fractured ductile metal part according to the present invention comprises of the step of pressing the fracture surfaces of said fractured ductile metal part against each other with a sufficient pressing force for fitting them properly to each other facing a strain produced in said fracture part, in addition to applying vibration to said fractured ductile metal part portions in a state of keeping them apart from each other.

Preferably, a manufacturing method of a ductile metal part being fractured and having its fracture surfaces treated comprises of the steps of fitting halved mandrel portions into a penetrative bore of the ductile metal part having said penetrative bore, driving a wedge in between the halved mandrel portions and thereby fractures the ductile metal part, and treating the fracture surfaces of the fractured ductile metal part by means of said fracture surface treatment method.

Preferably, a fracture surface treatment apparatus of a fractured ductile metal part according to the present invention comprises a face fitting means for pressing the fracture surfaces of said fractured ductile metal part against each other with a sufficient pressing force for fitting them properly to each other facing a strain produced in said fracture part, in addition to a vibration applying means for applying vibration to said fractured ductile metal part portions in a state of keeping them apart from each other.

Not only by stripping off fracture powder stuck on fracture surfaces when the fracture surfaces are apart from each other but also by pressing the fracture surfaces against each other with a certain force and thereby fitting them properly to each other facing a strain produced in the fracture portions, it is possible to fit the fracture surfaces more properly to each other and make a ductile metal part easy to separate in the final assembly process of the fractured ductile metal part.

Preferably, a fracture surface treatment method of a fractured ductile metal part according to the present invention comprises of the step of performing alternately at specified times an operation of applying said vibration and an operation of pressing the fracture surfaces of said fractured ductile metal part against each other.

Preferably, a fracture surface treatment apparatus of a fractured ductile metal part according to the present invention performs alternately at a specified number of times an operation of applying said vibration by means of said vibration applying means and an operation of pressing the fracture surfaces of said fractured ductile metal part against each other by means of said face fitting means.

The fracture surfaces of a ductile metal part are made into fracture surfaces more suitable for a face fitting operation by repeating such operations alternately at a specified number of times.

Preferably, a manufacturing method of a ductile metal part being fractured and having its fracture surfaces treated according to the present invention comprises of the steps of fitting halved mandrel portions into a penetrative bore of the ductile metal part having said penetrative bore, driving a wedge in between the halved mandrel portions and thereby fractures the ductile metal part, and treating the fracture surfaces of the fractured ductile metal part by means of said fracture surface treatment method.

Preferably, a manufacturing apparatus of a ductile metal part being fractured and having its fracture surfaces treated according to the present invention comprises a fracture surface treatment apparatus described above, fits halved mandrel portions into a penetrative bore of the ductile metal part having said penetrative bore, drives a wedge in between the halved mandrel portions and thereby fractures the ductile metal part.

By using such a manufacturing method and a manufacturing apparatus of a ductile metal part being fractured and having its fracture surfaces treated, it is possible to obtain a ductile metal part being fractured, having its fracture surfaces treated and being suitable for a face fitting operation.

DESCRIPTION OF THE PREFERRED EMBODIMENTS

A fracture surface treatment apparatus and a fracture surface treatment method of a ductile metal part according to a first embodiment of the present invention are described in the following.

A fracture surface treatment apparatus 1 of a ductile metal part according to this embodiment is an apparatus for removing fracture powder stuck on fracture surfaces of a connecting rod fractured by a connecting rod fracturing apparatus for fracturing a connecting rod being one type of ductile metal parts and being used in an automobile.

Figure 1:
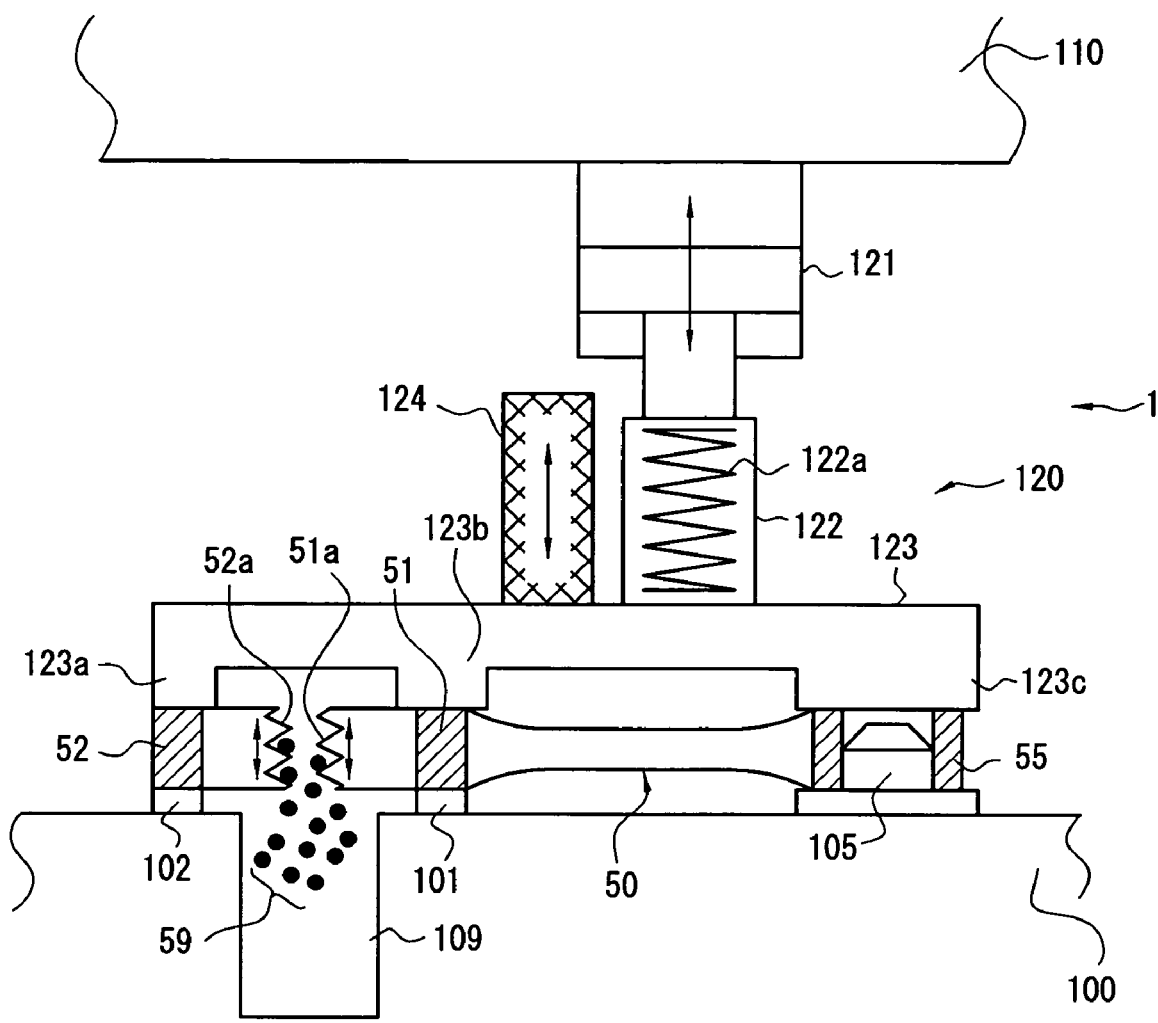
FIG. 1 is a schematic side view of a fracture surface treatment apparatus of a ductile metal part according to a first embodiment of the present invention, said apparatus having a ductile metal part attached to it, and hatching of a section is partially omitted.

A fracture surface treatment apparatus 1 of a ductile metal part according to the first embodiment of the present invention (hereinafter, referred to as a fracture surface treatment apparatus 1) is mounted between a lower base 100 and an upper base 110 which are arranged with a certain space between them and each are formed as a rigid body by unshown supporting stays, as shown in FIG. 1.

A fracture powder receiver 109 for receiving fracture powder 59 removed by the fracture surface treatment apparatus 1 is formed in the lower base 100. And positioning spacers 101 and 102 for positioning a fractured connecting rod 50 (ductile metal part) are arranged at both sides of an opening of the fracture powder receiver 109. And a small end pin 105 for constraining a small end portion 55 of the connecting rod 50 by being fitted into the small end portion 55 is attached distantly from these positioning spacers 101 and 102 on the lower base 100. And an unshown constrainer for constraining a rod side large end portion 51 and a cap side large end portion 52 which are positioned on the lower base 100 is also mounted on the lower base 100.

The upper base 110 is provided with a vibration applying portion 120. The vibration applying portion 120 comprises a clamper cylinder 121, a damper 122, a damper 123 and a vibration actuator 124. And the clamper 123 is mounted on the upper base 110 in a state of being hung down from the upper base 110 through the clamper cylinder 121 and the damper 122. And the vibration actuator 124 is mounted on the top of the clamper 123.

An air cylinder is used as the clamper cylinder 121. However, the clamper cylinder 121 is not limited to an air cylinder but may be a hydraulic cylinder.

And a plurality of coned-disk springs 122a are built in inside the damper 122. The reason why the damper 122 is interposed between the clamper 123 and the clamper cylinder 121 is to suppress the propagation of vibration to other components such as a clamper cylinder 121 for operating the clamper 123 and the like by interposing such a spring element and thereby prevent a trouble to be caused by applying vibration. Accordingly, in case that such a problem does not occur, the damper 122 is not necessarily required.

Due to this, when the clamper cylinder 121 is supplied with a certain air pressure to operate, it applies a downward certain pressing force to the clamper 123 through the damper 122. And as the vibration actuator 124, there is used a pneumatic vibrator of an air pressure type capable of providing vibration of 50 Hz to 100 Hz to the clamper 123 for one to several seconds, for example.

In such a way, the clamper 123 is used to perform a clamping operation through a spring element such as a spring, an air damper or the like in consideration of the propagation of vibration.

The clamper 123 is made of a metal material being excellent in shock resistance, and is E-shaped in a side view in appearance. The clamper 123 has projections to press against the connecting rod 50 at three positions, and a first projection 123a is pressed against a part of the upper face of the cap side large end portion 52, a second projection 123b is pressed against the upper face of the rod side large end portion 51 and a third projection 123c is pressed against the upper face of the small end portion 55.

This configuration clamps and holds a fractured connecting rod 50 through the positioning spacers 102 and 103, the small end pin 105 and the clamper 123 and by means of a pressing force of the clamper cylinder 121 connected to the clamper 123. And the vibration actuator 124 is timely operated in a state of keeping the fractured connecting rod 50, and vibration from the vibration actuator 124 acts on fracture surfaces 51a and 52a of the connecting rod 50 through the clamper 123 in a direction perpendicular to the direction of fracture of the connecting rod 50.

The pressing force of the clamper 123 against the connecting rod 50 is properly adjusted. That is to say, the clamping force is adjusted so loosely that when vibration is applied a slight clearance is made between the clamper 123 and the connecting rod 50, and the clamper 123 jumps slightly and the vibration is sufficiently propagated to the connecting rod 50. As a result, it is possible to efficiently remove fracture powder 59 by means of vibration caused by a fact that the clamper 123 repeats an operation of touching on and separating from the connecting rod 50.

Although not shown in FIG. 1, the fracture surface treatment apparatus 1 is provided with an air nozzle for blowing air against the fracture surfaces 51a and 52a in the vicinity of the fracture surfaces of the connecting rod 50. And it assists in removal of fracture powder from the fracture surfaces 51a and 52a by means of air blow during a vibration process.

That is to say, the constraint of fracture powder 59 a part of which is stripped off from the fracture surfaces 51a and 52a and the remaining part of which is stuck on these surfaces is loosened by application of vibration in a direction parallel with the fracture surfaces 51a and 52a and thereby the said fracture powder 59 can be easily removed by air blow even in case that the fracture powder 59 cannot be removed only by vibration of the vibration actuator 124.

An example and an operation of a fracture surface treatment method of a connecting rod 50 using a fracture surface treatment apparatus 1 according to the first embodiment of the present invention are described in the following.

First, a connecting rod 50 fractured by a connecting rod fracturing apparatus (not illustrated) is carried from this fracturing apparatus and is positioned on the lower base 100 of the fracture surface treatment apparatus 1.

In this positioning, the small end portion 55 of the connecting rod 50 is fitted onto the small end pin 105 of the lower base 100 of the fracture surface treatment apparatus and the rod side large end portion 51 of the fractured connecting rod 50 is positioned on the rod side positioning spacer 101 of the lower base 100. And the cap side large end portion 52 of the fractured connecting rod 50 is positioned on the cap side positioning spacer 102 of the lower base 100.

The rod side large end portion 51 and the cap side large end portion 52 are positioned in a state of being apart from each other by a certain distance by positioning the rod side large end portion 51 on the rod side positioning spacer 101 and positioning the cap side large end portion 52 on the cap side positioning spacer 102. And the rod side large end portion 51 and the cap side large end portion 52 of the connecting rod 50 are constrained by an unshown constraining means so as not to be slipped out of place on the lower base 100.

Next, the damper 122, the clamper 123 and the vibration actuator 124 are moved downward by operating the clamper cylinder 121 downward in FIG. 1. Thereby, the fractured connecting rod 50 is clamped with a clamping force adjusted in advance by the clamper 123 through the damper 122.

Next, for example, in case that the vibration actuator 124 is composed of a pneumatic vibrator, the vibration actuator 124 is made to perform a vibrating operation by feeding air to the said pneumatic vibrator. This vibrating operation applies a vibration of about 50 Hz to 100 Hz in frequency for about one second in time. Thereby the vibration is propagated to the connecting rod 50.

At this time, since the clamping force is adjusted so loosely that a slight clearance is made between the clamper 123 and the connecting rod 50, during application of vibration the clamper 123 jumps slightly and the vibration is propagated to the connecting rod 50. And fracture powder 59 is efficiently removed from the fracture surfaces 51a and 52a by vibration caused by a fact that the clamper 123 repeats an operation of touching on and separating from the connecting rod 50.

In more detail, since the vibration acts in a direction parallel with the fracture surfaces 51a and 52a of the connecting rod 50, for example in case that part of fracture powder 59 is stuck on the fracture surfaces 51a and 52a the vibration acting in such a direction shakes the fracture powder itself up and down in the direction of action of gravity, and thereby a shearing force based on the weight of the fracture powder 59 acts on the sticking portion of the fracture powder 59 on the fracture surfaces 51a, 52a and thereby strips off the fracture powder 59 from the fracture surfaces 51a and 52a.

At this time, in order to enhance the effect of removal of fracture powder, air is blown directly against the fracture surfaces from an air nozzle not illustrated. Thus, during the vibration process the fracture powder 59 is more securely removed from the fracture surfaces 51a and 52a by the air blow.

That is to say, the constraint of fracture powder 59 a part of which is stripped off from the fracture surfaces 51a and 52a and the remaining part of which is stuck on these surfaces is loosened by application of vibration in a direction parallel with the fracture surfaces 51a and 52a and thereby the said fracture powder 59 can be easily removed by air blow even in case that the fracture powder 59 cannot be removed only by vibration of the vibration actuator 124.

By applying such vibration to the connecting rod 50, fracture powder 59 stuck on the whole fracture surfaces is securely pulled apart from the fracture surfaces 51a and 52a, and is housed in the fracture powder receiver 109 provided in the lower base 100. Since this fracture surface treatment is performed in a state where the fracture surfaces themselves are apart from each other, the fracture powder 59 can be more securely removed without pressing fracture powder 59 stuck on one fracture surface 51a (or 52a) against the other fracture surface 52a (or 51a).

Successively, a fracture surface treatment apparatus of a ductile metal part according to a second embodiment of the present invention is described. A fracture surface treatment apparatus 2 of a ductile metal part according to the second embodiment of the present invention (hereinafter, referred to as a fracture surface treatment apparatus 2) is an apparatus for treating fracture surfaces of a connecting rod being one type of ductile metal parts and being used as one of parts of an automobile in the same manner as the fracture surface treatment apparatus 1 according to the first embodiment.

Figure 2:
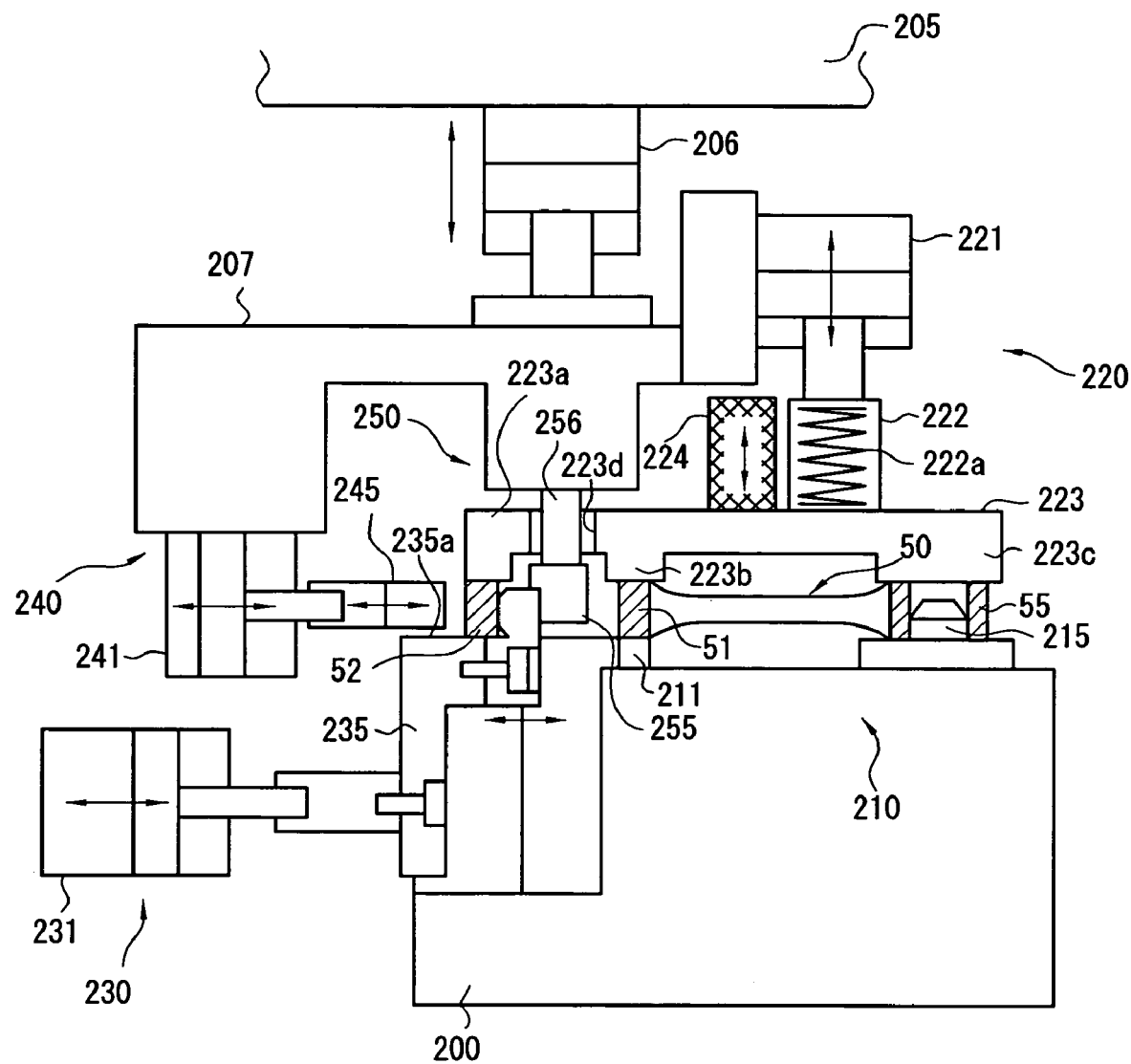
FIG. 2 is a side view of a fracture surface treatment apparatus of a ductile metal part according to a second embodiment of the present invention, said apparatus having a ductile metal part attached to it, and hatching of a section is partially omitted.

A fracture surface treatment apparatus 2 according to the second embodiment of the present invention comprises a lower base 200 and an upper base 205 which are arranged being apart from each other by a certain distance through unshown supporting stays, as shown in FIG. 2, and the lower base 200 comprises a connecting rod positioning portion 210 and a fracture surface separating portion 230. On the other hand, on the lower face of the upper base 205 there are provided a main cylinder 206 and a supporting frame 207 attached to the main cylinder 206. And the supporting frame 207 is provided with a fracture surface pressing portion (face fitting means) 240 of a connecting rod 50, a bore centering chuck 250 of the connecting rod 50 and a vibration applying portion 220.

The connecting rod positioning portion 210 mounted on the lower base 200 comprises a small end pin 215 being mounted on the top of the lower base 200 and positioning a small end portion 55 of the connecting rod 50 by being engaged with this portion and a rod side positioning spacer 211 for positioning a rod side large end portion 51 of the fractured connecting rod 50 by abutting against this rod side large end portion 51. And a cap side large end portion 52 of the fractured connecting rod 50 is positioned in a state where it is placed on a part of a separating pad 235 provided on the fracture surface separating portion 230.

Figure 3A:
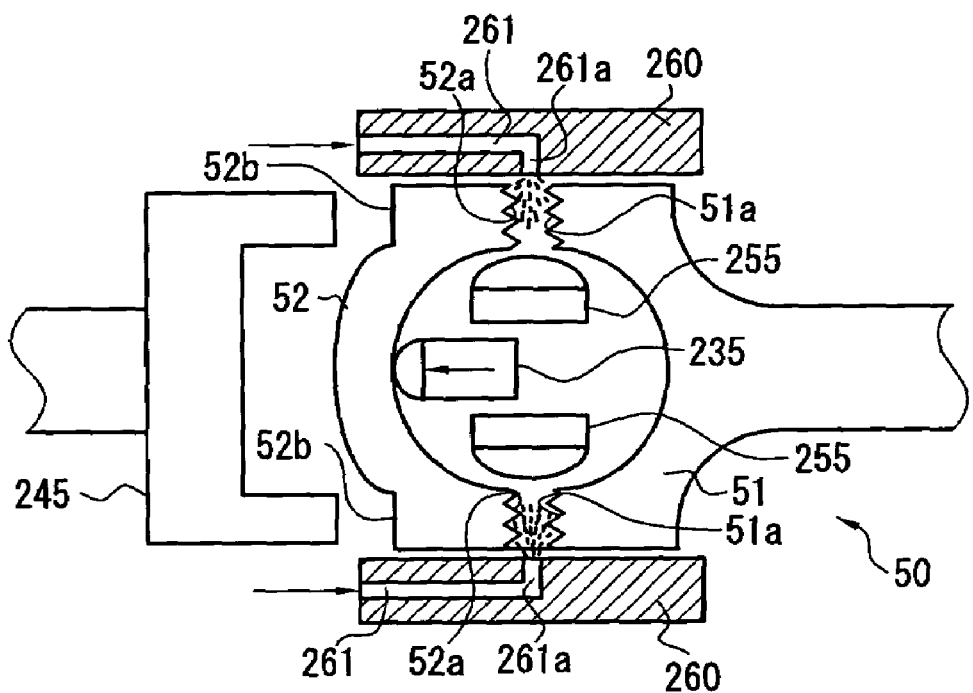
FIG. 3A is a plan view of a fracture surface treatment apparatus of a ductile metal part according to a second embodiment of the present invention in a state where the fracture surfaces of a connecting rod are pulled apart from each other.
Figure 3B:
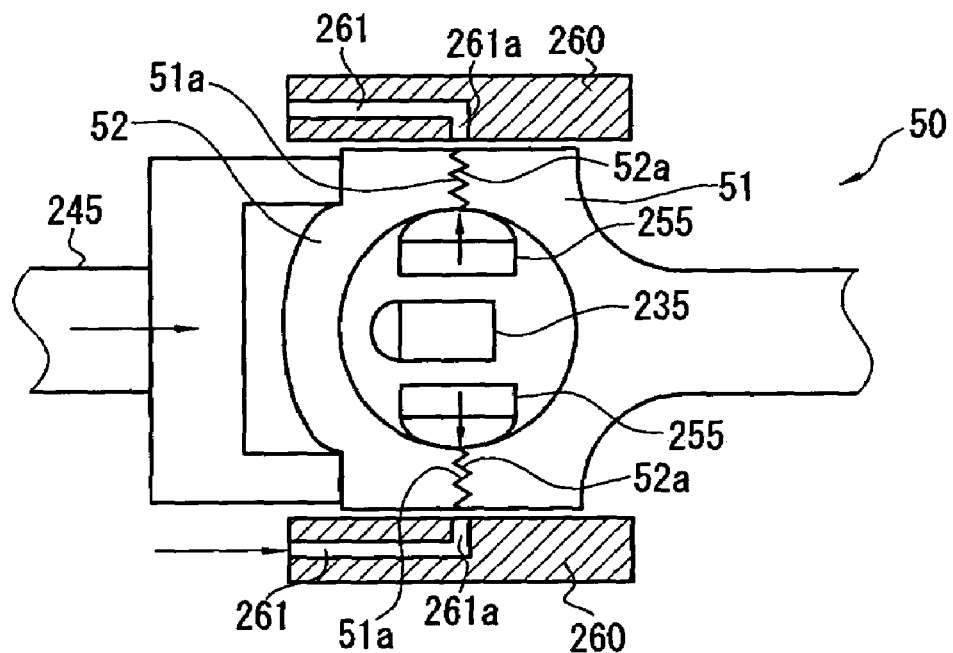
FIG. 3B is a plan view of a fracture surface treatment apparatus of a ductile metal part according to a second embodiment of the present invention in a state where the fracture surfaces of a connecting rod are pressed against each other.

The fracture surface separating portion 230 comprises a fracture surface separating cylinder 231 and a separating pad 230 being attached to a piston of the said cylinder 231 and slightly reciprocating in a horizontal direction relative to the lower base 200 in a state where a connecting rod is mounted on it. The separating pad 235 is formed by coupling a plurality of members together through proper clamping means such as screws and the like. And the cap side large end portion 52 of the fractured connecting rod 50 is positioned and fixed on an upper horizontal face 235a of the separating pad 235. And as shown in FIGS. 3A and 3B, the fore-end of the separating pad 235 can be abutted against or separated from the inner circumferential face of the cap side large end portion of the fractured connecting rod 50.

Concretely, in case that the fracture surface separating cylinder 231 is operated, the fracture surface 52a of the cap side large end portion 52 is moved so as to be pulled apart from the fracture surface 51a of the rod side large end portion 51 and the facture surfaces 51a and 52a are kept apart from each other by a certain distance.

On the other hand, the fracture surface pressing portion 240 has a fracture surface pressing cylinder 241 and a pressing pad 245 coupled with a piston of the said cylinder 241, and the fore-end of the pressing pad 245 is abutted against or separated from a shoulder 52b (see FIG. 3A) of the cap side large end portion 52 of the fractured connecting rod 50 in this embodiment. And the fracture surfaces are exactly fitted to each other by pressing the cap side large end portion 52 of the fractured connecting rod 50 against the rod side large end portion 51 through driving the fracture surface pressing cylinder 241, and further are pressed against each other with a specified pressing force by the fracture surface pressing cylinder 241, concretely, with a pressing force of such a degree that the fracture surfaces 51a and 52a fit each other facing a strain produced in the fracture part of the large end portions 51 and 52.

By improving the surface fitting through fitting the fracture surfaces 51a and 52a in this manner, it is possible to make it easy to separate a connecting rod in the final assembly process of the connecting rod and improve the operability.

And the bore centering chuck 250 has two chuck pads 255 through a supporting shaft 256 (see FIG. 3), and the said two chuck pads 255 are arranged inside the large end portion of the fractured connecting rod 50.

The bore centering chuck 250 performs a role of making the fracture surfaces accurately fitted to each other (see FIG. 3B) by spreading the two chuck pads from each other to press the fracture portions of the inner circumferential face of the large end portion of the connecting rod from inside when pressing the fracture surfaces 51a and 52a of the cap side large end portion 52 and the rod side large end portion 51 of the connecting rod 50 against each other by means of the fracture surface pressing portion 240. That is to say, the bore centering chuck 250 assists in pressing the fracture surfaces 51a and 52a of the fractured connecting rod 50 in the optimum state by means of the fracture surface pressing portion 240.

On the other hand, the vibration applying portion 220 has basically the same structure as the vibration applying portion 120 of the fracture surface treatment apparatus 1 according to the first embodiment of the present invention. That is to say, the vibration applying portion 220 comprises a clamper cylinder 221 at an end of the supporting frame 207 connected to the main cylinder 206, and the said clamper cylinder 221 has a damper 222 coupled to it, and the damper 222 has a clamper 223 attached to it, said clamper 223 pressing the connecting rod 50 against the lower base 200 from above. And a vibration actuator 224 is mounted on the upper face of the clamper 223 (upper face in the figure). The vibration actuator 224 performs a role of removing fracture powder 59 produced on the fracture surfaces 51a and 52a of the connecting rod 50 in the same manner as the first embodiment.

The clamper 223 is E-shaped in a side view like the first embodiment, and a penetrative bore 223d for having the supporting shaft 256 of the bore centering chuck 250 penetrated into it is provided in a part of the clamper 223 in this embodiment. The clamper 223 is pressed against the connecting rod 50 only in a state where the cap side large end portion 52 and the rod side large end portion 51 of the fractured connecting rod 50 are separated from each other (the fracture surfaces are apart from each other).

The clamper 223 has a first projection 223a, a second projection 223b and a third projection 223c similarly to the first embodiment, and the first projection 223a is pressed against the upper face of the cap side large end portion 52 supported by the cap separating portion 230 of the connecting rod 50. And the second projection 223b is pressed against the upper face of the rod side large end portion 51 of the connecting rod 50 supported through the rod side positioning spacer 211 of the lower base 200. And the third projection 223c is similarly pressed against the upper face of the small end portion of the connecting rod 50 positioned by the small end pin 215 of the lower base 200.

And the clamper cylinder 221 is composed of an air cylinder and delivers a force generated by a certain air pressure to the clamper 3 through the damper 222.

The damper 222 is provided with a plurality of elastic bodies 222a such as coned-disk springs and the like not illustrated in detail here. The reason why the damper 222 is interposed between the clamper 223 and the clamper cylinder 221 is to suppress the propagation of vibration to other components such as the clamper cylinder 221 for operating the clamper 223 and the like by interposing such a spring element and thereby prevent a trouble to be caused by applying vibration. Accordingly, in case that such a problem does not occur, the damper 222 is not necessarily required.

And as the vibration actuator 224, there is used a publicly known vibration actuator such as a pneumatic vibrator for example similar to that of the first embodiment, said vibration actuator providing vibration of 50 Hz to 100 Hz to the clamper 223 for one to several seconds by supplying air from the outside for example. This vibration acts in a direction parallel with the fracture surfaces 51a and 52a of the fractured connecting rod 50. Due to this, it is possible to efficiently apply this vibration to the fracture surfaces 51a and 52a of the connecting rod 50 through the clamper 223 and thereby securely remove fracture powder 59 stuck on the fracture surfaces 51a and 52a.

As shown in FIGS. 3A and 3B, a guide 260 is arranged slightly apart from each side face of the large end portions 51 and 52 of the connecting rod 50, and has an air blowing portion 261 having a blowing opening 261a provided at a position corresponding to the fracture surfaces 51a and 52a of the connecting rod 50. And when the fracture surfaces of the connecting rod 50 are separated from each other and vibration is applied to the fracture surfaces 51a and 52a by the vibration actuator 224, a certain air blown through the blowing opening 261a from an unshown compressor assists in removing fracture powder 59 from the fracture surfaces 51a and 52a (see an air blowing state in FIG. 3A).

The use and operation of a fracture surface treatment apparatus 2 according to the second embodiment of the present invention are exemplarily described in the following.

First, a connecting rod 50 fractured by a fracturing apparatus not illustrated is carried from this fracturing apparatus and is positioned on the lower base 200 of the fracture surface treatment apparatus 2.

In this positioning, the small end portion 55 of the connecting rod 50 is fitted onto the small end pin 215 of the lower base 200 of the fracture surface treatment apparatus 2 and the rod side large end portion 51 of the connecting rod 50 which is fractured is positioned on the rod side positioning spacer 211 of the lower base 200. And the cap side large end portion 52 of the fractured connecting rod 50 is positioned on the upper face of the separating pad 235 of the fracture surface separating portion 230.

Hereupon, vibration is applied to the connecting rod 50 by the vibration applying portion 220 as keeping the fracture surfaces 51a and 52a of the connecting rod 50 apart from each other. How to apply vibration is basically the same as the fracture surface treatment apparatus 1 according to the first embodiment. Concretely, the fracture surface pressing cylinder 241 is moved leftward in FIG. 2 to separate the pressing pad 245 from the cap side large end portion 52.

Next, the clamper cylinder 221 is operated downward in FIG. 2, and thereby the damper 222, the clamper 223 and the vibration actuator 224 are moved downward. Due to this, the fractured connecting rod 50 is clamped with a clamping force adjusted by the clamper 223 through the damper 222.

Next, for example, in case that the vibration actuator 224 is composed of a pneumatic vibrator, the vibration actuator 224 is made to operate by feeding air to the said pneumatic vibrator. This vibrating operation applies a vibration of about 50 Hz to 100 Hz in frequency for example, for about one second in time for example. Thereby the vibration is propagated to the connecting rod 50 and fracture powder 59 on the fracture surfaces 51a and 52a is removed. At this time, in order to enhance the effect of removing fracture powder, air is blown directly to the fracture surfaces 51a and 52a from the air blowing portion 261.

By performing an air blowing operation during a vibration process in such a manner, it is possible to enhance the effect of removing fracture powder from the fracture surfaces 51a and 52a.

Thus, the constraint of fracture powder 59 a part of which is stripped off from the fracture surfaces 51a and 52a and the remaining part of which is stuck on these surfaces is loosened by application of vibration in a direction parallel with the fracture surfaces 51a and 52a and thereby the fracture powder 59 can be easily removed by air blow even in case that the fracture powder 59 cannot be removed by vibration.

Since the vibration acts in a direction parallel with the fracture surfaces 51a and 52a of the connecting rod 50, similarly to the first embodiment for example in case that part of fracture powder 59 is stuck on the fracture surfaces 51a and 52a the vibration acting in such a direction shakes the fracture powder itself up and down in the direction of action of gravity and thereby a shearing force based on the weight of the fracture powder 59 acts on the sticking part of the fracture powder 59 on the fracture surfaces 51a, 52a and thereby strips off the fracture powder 59 from the fracture surfaces 51a and 52a.

By applying vibration to the connecting rod 50 in such a manner, fracture powder 59 stuck on the whole fracture surfaces is efficiently pulled apart and is housed in an unshown fracture powder receiver provided in the lower base 200. Since this fracture surface treatment is performed in a state where the fracture surfaces themselves are apart from each other, the fracture powder 59 is more securely removed without pressing fracture powder 59 stuck on one fracture surface 51a (or 52a) against the other fracture surface 52a (or 51a).

After such pressing and such application of vibration have been ended, the clamper cylinder 231 is operated upward to pull the clamper 223 somewhat apart from the connecting rod 50. And a fracture surface pressing operation being a subsequent fracture surface treatment is performed. At the time of performing this pressing operation, since the cap side large end portion 52 needs to be guided to the rod side large end portion 51 so that the fracture surfaces 51a and 52a are not slipped out of place relative to each other when pressing the fracture surfaces together, the guide is performed by opening the bore centering chuck 250 and pressing the centering pads 255 against the inner circumferential face of the large end portion of the connecting rod.

Next, the fracture surface pressing cylinder 241 is operated to move the pressing pad 245 rightward in FIG. 2 and press the cap side large end portion 52 against the rod side large end portion 51. At this time, a sufficiently large load for closely sticking and properly fitting the fracture surfaces 51a and 52a to each other facing a strain in the fracture part is applied as a pressing load.

Subsequently, a state where the cap side large end portion 52 is pressed against the rod side large end portion 51 (in the state of loading) is kept for a certain time. The fracture surfaces 51a and 52a to be mated with each other are sufficiently well fitted to each other by pressing the fracture surfaces against each other for a certain time, and thus the face fitting of the fracture surfaces 51a and 52a is improved.

Following this, the fracture surface pressing cylinder 241 is operated to move the pressing pad 245 leftward in FIG. 2 to pull the pressing pad 245 apart from the cap side large end portion 52.

Subsequently, the bore centering chuck 250 is closed and the centering pads 255 are pulled apart from the inner circumferential surface of the large end portion.

Following this, the fracture surface separating cylinder 231 is operated to move the separating pad 235 leftward in FIG. 2 and pull the cap side large end portion 52 apart from the rod side large end portion 51. Due to this, the separating pad 235 comes to be located at the left in FIG. 3, namely, comes to be attached to the cap side large end portion 52.

Next, the fracture surface separating cylinder 231 is operated to move the separating pad 235 rightward in FIG. 2 and pull the separating pad 235 apart from the cap side large end portion 52 and thus the fracture surfaces come again to be apart from each other.

After this, so far as the cycle time permits, such an operation of applying vibration to the connecting rod 50 in a state where the fracture surfaces are separated apart from each other and an operation of pressing the fracture surfaces against each other as described above are repeated. In general, the number of the repeated operations is said to be preferably about two to five but is not limited to this number of times.

Thus, in addition to the effect of securely removing fracture powder 59 from the fracture surfaces 51a and 52a by applying vibration, the fracture surfaces to be mated with each other are well fitted to each other and thereby the face fitting of the fracture surfaces 51a and 52a is comprehensively improved. And in the final assembly process of a connecting rod, by reducing a separating force for separating fracture surfaces of the connecting rod from each other, the connecting rod is made to separate so easily that for example an operator can easily separate it by hand and thus the operability is improved.

Although the above-described embodiment uses a damper 222 provided with coned-disk springs in order to improve the ability of propagating vibration of the clamper 223, a damper provided with an elastic body such as a coil spring and the like or an air damper may be used in place of the damper 222. Interposing a spring element in such a manner suppresses the propagation of vibration to other components such as a cylinder for operating the clamper 223 and the like and prevents a trouble to be caused by application of vibration.

Although the above-mentioned two embodiments provide a damper being a spring element at only a clamper side, a positioning spacer of the lower base may be a support made of a spring element.

And although an air cylinder is used as each of the above-mentioned cylinders, it is not limited to this but a hydraulic cylinder may be used. And a gas to be blown against fracture surfaces is not limited to air but may be an inert gas such as nitrogen and the like.

And the frequency and application time of vibration related to application of vibration in the above-mentioned embodiments have been shown as only an example and are not limited to the frequency of vibration and application time of vibration described in the above embodiments.

And the application of vibration is preferably performed onto both fracture surfaces of a fractured ductile metal part but the application of vibration performed onto only one of fracture surfaces can provide an effect in its own way.

And the application of vibration does not necessarily need to be performed in a direction perpendicular to the direction of fracture like these embodiments but the application of vibration performed in a direction intersecting the direction of fracture can provide an effect of removal of fracture powder in its own way.

A fracture surface treatment apparatus and a fracture surface treatment method of a ductile metal part according to the present invention can be widely applied to a facture surface treatment of such parts as a bearing, a halved spacer and the like, said parts each having a penetrative bore in a part of it, forming a halved part by halving it at a specific fracture part through applying a tensile stress, and abutting again the fracture surfaces of the said halved part against each other to be used.

As described above, according to a fracture surface treatment method and a fracture surface treatment apparatus of a ductile metal part for treating fracture surfaces, of the present invention, it is possible to perform the optimum face fitting operation in case of fitting again the fracture surfaces of a fractured ductile metal part to each other.

And according to a fracture surface treatment method and a fracture surface treatment apparatus of a fractured ductile metal part being fractured and having its fracture surfaces treated, of the present invention, it is possible to obtain a fractured ductile metal part in which the optimum face fitting operation can be performed in case of fitting again the fracture surfaces to each other.

What is claimed is:

1. A fracture surface treatment method of a fractured ductile metal part for treating fracture surfaces of the ductile metal part, said fracture surfaces being obtained by a fracturing operation of fitting halved mandrel portions into a penetrative bore of the ductile metal part and driving a wedge in between the halved mandrel portions, comprising the steps of;

holding said fractured ductile metal part portions in a state where said fracture surfaces are separated from each other so as to keep a certain space between them, applying a specified vibration to at least one of said fractured ductile metal part portions in an up-and-down direction so as to maintain a certain space between said fracture surfaces, and thereby removing fracture powder stuck on said fracture surfaces.

2. A fracture surface treatment method of a fractured ductile metal part according to claim 1, further comprising the step of blowing air against the fracture surfaces of said ductile metal part in case of applying said specified vibration to said fractured ductile metal part.

3. A fracture surface treatment method of a fractured ductile metal part according to claim 1, further comprising the step of pressing the fracture surfaces of said fractured ductile metal part against each other with a sufficient pressing force for well fitting them to each other facing a strain produced in said fracture part in addition to applying vibration to said fractured ductile metal part portions in a state where they are apart from each other.

4. A fracture surface treatment method of a fractured ductile metal part according to claim 3, further comprising the step of repeating an operation of applying said vibration and an operation of pressing the fracture surfaces of said fractured ductile metal part against each other alternately at a specified number of times.

5. A manufacturing method of a fractured ductile metal part being fractured and having its fracture surfaces treated, comprising the steps of;

fitting halved mandrel portions into a penetrative bore of the ductile metal part having the penetrative bore, driving a wedge in between said halved mandrel portions and thereby fracturing said ductile metal part, and holding said fractured ductile metal part portions in a state where said fracture surfaces are separated from each other so as to keep a certain space between them, applying a specified vibration to at least one of said fractured ductile metal part portions in an up-and-down direction so as to maintain a certain space between said fracture surfaces, and thereby removing fracture powder stuck on said fracture surfaces.

* * * * *